June 23, 1959  R. L. HEINRICH ET AL  2,891,401
METHOD FOR TESTING THE CONCENTRATION OF SULFURIC
ACID USED FOR CATALYZING REACTIONS
Filed March 3, 1954  3 Sheets-Sheet 1

INVENTORS.
Raymond L. Heinrich,
BY Mathis T. Waddell,

ATTORNEY.

2,891,401

United States Patent Office
Patented June 23, 1959

2,891,401

METHOD FOR TESTING THE CONCENTRATION OF SULFURIC ACID USED FOR CATALYZING REACTIONS

Raymond L. Heinrich and Mathis T. Waddell, Baytown, Tex., assignor, by mesne assignments, to Esso Research and Engineering Company, Elizabeth, N.J., a corporation of Delaware Application March 3, 1954, Serial No. 413,902

1 Claim. (Cl. 73—190)

This application is directed to a procedure for measuring and controlling the concentration of sulfuric acid used as a catalyst in an organic reaction where fresh catalyst is added to the reaction zone to maintain the concentration of said sulfuric acid being used as a catalyst.

In a number of commercial reactions, a body of sulfuric acid is employed as the catalyst and it is desirable or many times essential that said body of sulfuric acid be maintained within a predetermined range of concentration. The body of sulfuric acid is maintained within said predetermined range of concentration by adding increments of fresh acid and withdrawing increments of spent acid. An example of a well known reaction of this character is the alkylation of paraffin with an olefin in which sulfuric acid within the concentration of 88 to 100% is employed as the catalyst. A description of such a process is found in "The Science of Petroleum," vol. 5, part II, Oxford University Press, 1953, pages 286–301 and "Chemical Reviews," vol. 37, pages 323–399 (1945).

In accordance with the present invention, a body of sulfuric acid in a reaction zone used as a catalyst in a continuous organic reaction process has its concentration maintained within the range of 86 to 99.5% by continuously measuring its concentration and controlling the rate at which fresh acid is added to the reaction zone in accordance with the concentration of the sulfuric acid therein.

Other advantages and objects of the present invention will be seen from the following description taken in conjunction with the drawing in which Figure 1 is in the form of a diagrammatic flow sheet illustrating one modification of the present invention;

Figure 1:
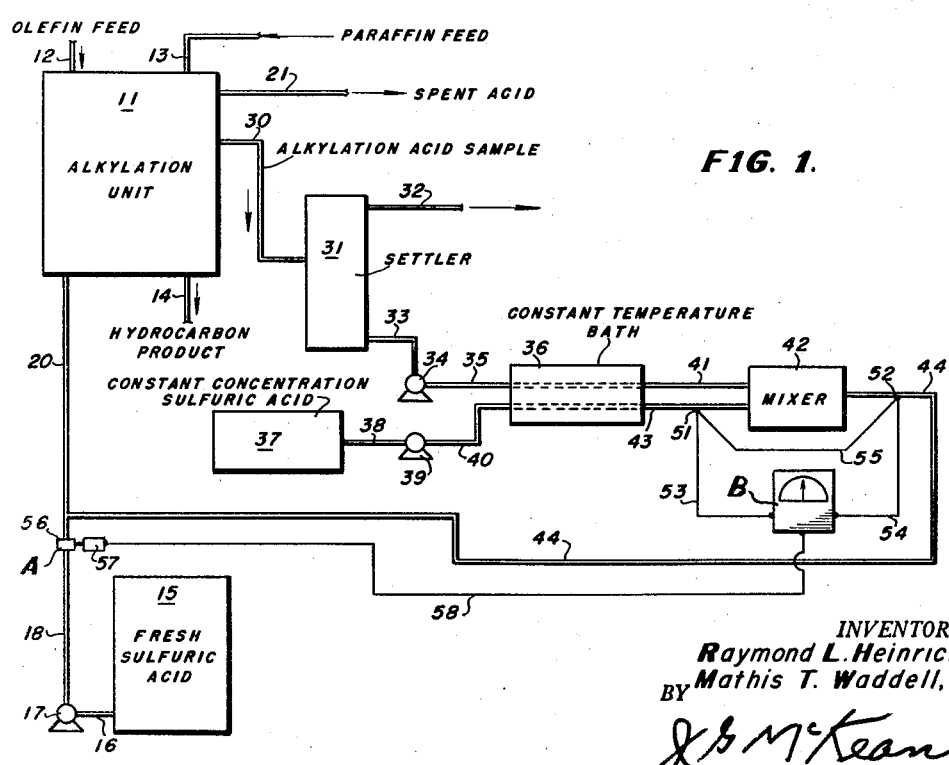

Turning now specifically to the drawing and first to Fig. 1, a rectangle 11 illustrates a commercial alkylation unit in which a body of sulfuric acid (not shown in the drawing) is maintained in the reaction zone as catalyst and in which an olefin feed stock is introduced through inlet line 12 and a paraffin feed stock is introduced through inlet line 13. Alkylated hydrocarboin product is withdrawn through outlet line 14.

Within the sulfuric acid alkylation zone 11, a body of sulfuric acid is maintained. The strength of this acid is maintained at a predetermined value within the range of 86 to 99.5% in accordance with the present invention. This is done by withdrawing fresh plant sulfuric acid of known substantially uniform concentration from storage vessel 15 through outlet line 16, pump 17 and discharge line 18 through a controller valve A and through line 20 to alkylation unit 11. In order to maintain equilibrium conditions, a like amount of spent sulfuric acid is withdrawn from alkylation unit 11 through outlet line 21. The rate at which the fresh sulfuric acid is passed from storage vessel 15 to alkylation unit 11 is controlled by controller valve A.

The means whereby the controller valve A operates will not be described. A continuous stream of alkylation acid is withdrawn from the alkylation zone in unit 11 by way of sample line 30 and discharged to a settler 31 where it is allowed to settle into a hydrocarbon phase which is discarded through outlet line 32 and an acid phase which is withdrawn through line 33 and passes through a constant volume proportioning pump 34 and outlet line 35 to a constant temperature bath 36 where it reaches a selected equilibrium temperature. At the same time fresh sulfuric acid of a constant predetermined concentration from storage vessel 37 is withdrawn through outlet line 38 and passes through proportioning pump 39 and outlet line 40 and thence into constant temperature bath 36 so that the spent acid from settler 31 and the fresh acid from storage vessel 37 are each brought to a selected predetermined temperature. The spent acid stream is discharged from constant temperature bath 36 through line 41 into a mixing device 42 where it is admixed with fresh acid withdrawn from constant temperature bath 36 by line 43. The two acid streams are thoroughly admixed in mixer 42 so that the outlet stream is at an equilibrium temperature. The outlet stream is withdrawn through line 44.

The difference in temperature of the mixture at equilibrium temperature and the temperature of a selected input stream is used to control the volume of fresh sulfuric acid being added to the sulfuric acid alkylation zone 11. A means for exercising said control is shown as a temperature recorder-controller device B. In the modification shown, the recorder-controller device B controls electrically, but it is to be understood that other types of recorder-controllers, such as pneumatic, may be used. The temperature recorder-controller device B is connected to a thermocouple 51 placed in line 43 for determining the temperature of the fresh sulfuric acid in said line and a thermocouple 52 placed in the outlet line 44 for determining the equilibrium temperature of the mixture. As shown in the drawing, the temperature controller device B is connected by electrical lead 53 to thermocouple 51 and by electrical lead 54 to thermocouple 52. Thermocouples 51 and 52 are connected together by electrical lead 55.

Temperature controller valve A consists of a valve body 56 in line 18 and a control body 57 which is electrically or pneumatically connected through line 58 to temperature controller B. Thus the volume of fresh sulfuric acid added to the alkylation zone 11 is varied as the difference between temperature of the stream in 43 and that of the stream in 44 varies. It will be understood that the thermocouple 51 might be equally well placed in line 41 since the streams in lines 41 and 43 have both come into substantial equilibrium and are at a substantially constant temperature with the temperature bath 36. Since the stream of acid mixture in line 44 in relatively small, it may be disposed of in any convenient way. However, in the drawing such stream is discharged into line 20 and passes into alkylation in unit 11 with the fresh acid withdrawn from storage vessel 15.

Figure 2:
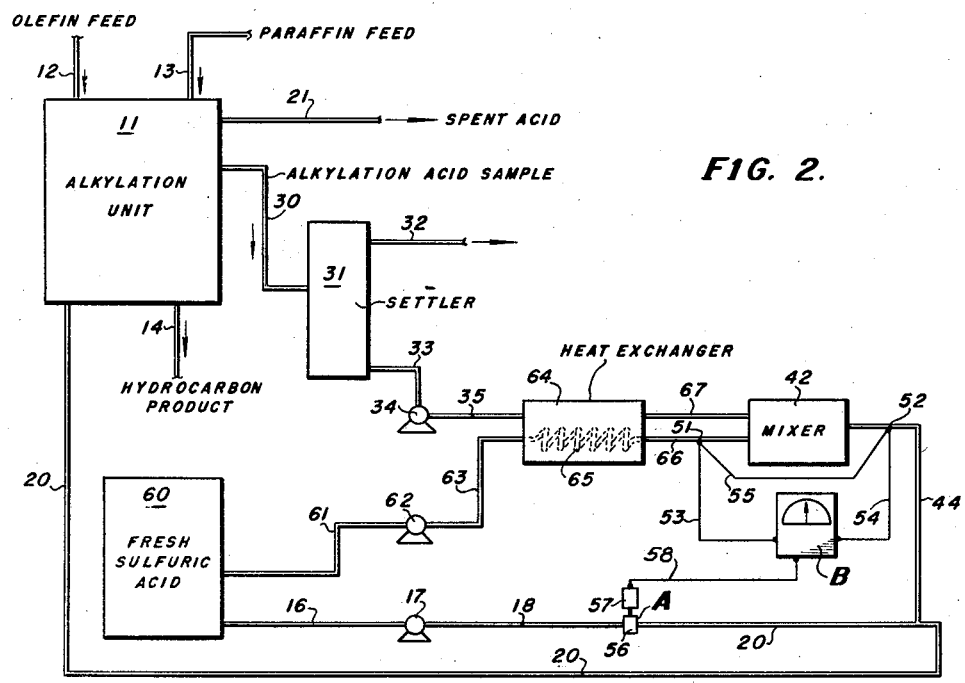
Fig. 2 is in the form of a diagrammatic flow sheet illustrating another modification of the present invention.

Another embodiment of the present invention is shown in Fig. 2. In this embodiment the parts corresponding to like parts of Fig. 1 are designated by identical reference characters. The embodiment of Fig. 2 differs from that of Fig. 1 in that the storage vessel 60 for fresh sulfuric acid supplies both the acid used for the catalyst in alkylation reaction in unit 11 and supplies sulfuric acid for the control means. Thus from sulfuric acid storage vessel 60 a stream of acid for alkylation unit 11 is withdrawn by outlet line 16 and passes by pump 17 and control valve A to line 20 and thence to alkylation unit 11. Another stream of sulfuric acid is withdrawn through line 61 and passes through proportioning pump 62 and discharge line 63 into a heat exchange unit 64 where it passes through coil 65 and is then discharged through outlet line 66 to mixer 42.

A sample stream of the sulfuric acid used as the catalyst in alkylation unit 11 is withdrawn through line 30 and passes to settler 31 where it is settled to a hydrocarbon fraction which is removed through outlet line 32 and a sulfuric acid fraction which is removed through line 33 and pumped by proportioning pump 34 and outlet line 35 into heat exchange unit 64 where it forms a body of liquid within the unit in heat exchange with the fresh acid passing through coil 65. Thus, the spent plant acid in unit 64 outside of coil 65 and the fresh acid within coil 65 are allowed to come to an equilibrium temperature. The spent acid is removed from heat exchanger 64 through line 67 and is discharged into mixer 42. Temperature controller B has a thermocouple 51 arranged in contact with the stream flowing through line 66 and a thermocouple 52 in contact with the stream flowing through line 44, the two thermocouples also being connected by electrical conductor 55. Thus, as in Fig. 1, a signal which is a function of the difference in temperature between one of the incoming streams going to the mixer and the temperature of the mixed materials is used to control the amount of fresh acid being added to the body of sulfuric acid employed as the catalyst in the alkylation process in unit 11.

In conducting the procedure of the present application, it is essential that the two streams of sulfuric acid admixed are each at some concentration within the range of about 86 to 99.5%. The reason for this limitation is that at a concentration of 86% all of the water in the sulfuric acid is in the form of a mono-hydrate whereas at concentrations less than about 86% some of the water is in the form of dihydrate. At concentrations greater than about 99.5%, the sulfuric acid may contain sulfur tri-oxide in addition to sulfuric acid and water. Thus, if each of the two acid streams are at some concentration within the range of 86 to 99.5% all of the water in the two streams being mixed is in the form of mono-hydrate.

Figure 3:
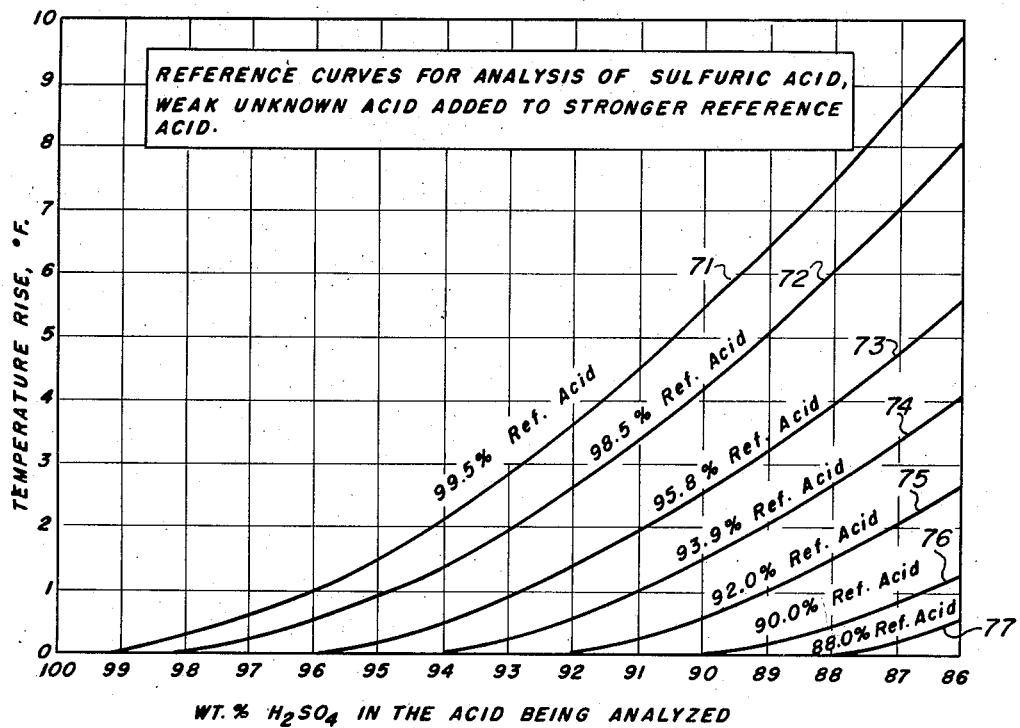
Fig. 3 is in the form of a family of curves.

In Fig. 3 are shown examples of temperature increases which are obtained when two streams of sulfuric acid are admixed with all of the water in each of the streams in the form of mono-hydrate. Fig. 3 is in the form of a family of curves. Curve 71 shows the temperature rise when 99.5% acid used as a reference acid is admixed with an equal volume of sulfuric acid having a concentration within the range of 86 to 99.5% acid. It will be seen that although all of the water in the sulfuric acids being mixed is in the form of mono-hydrate, a temperature increase is obtained, the amount of increases being a function of the concentrations of the two acid samples being mixed.

The other curves in Fig. 3, curves 72, 73, 74, 75, 76 and 77 show the temperature increases which occur when equal amounts of a reference acid are admixed with equal amounts of an unknown acid, these curves being for reference acids of 98.5%, 95.8%, 93.9%, 92%, 90% and 88%, respectively.

Figure 4:
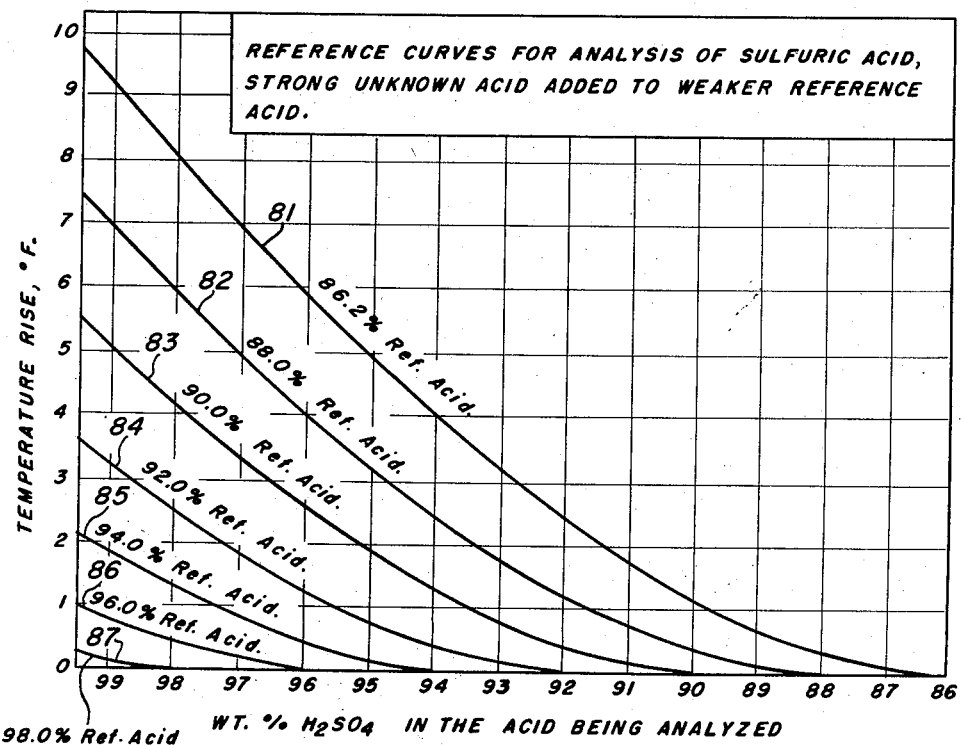
Fig. 4 is in the form of another family of curves.

Fig. 4 is in the form of a family of curves in showing the temperature increase occurring when a stronger unknown acid is added to weaker reference acid with all of the water in the sulfuric acids being mixed in the form of mono-hydrate. In Fig. 4, curves 81, 82, 83, 84, 85, 86, and 87 refer respectively to the temperature increases resulting when using as reference acids 86.2%, 88%, 90%, 92%, 94%, 96% and 98% acid respectively. It will be seen that in curve 81 where the reference acid is 86.2% the weight of acid being analyzed varies between 86.2% and 99.5% and the other acids being analyzed vary from the strength of the reference acid to 99.5%.

In most plant installations the make-up acid is stronger than the used acid so that usually in plant operations the family of curves showing Fig. 3 will be used with the analysis performed by mixing a weak unknown acid with a strong reference acid. However, as will be seen from the family of curves of Fig. 4, a weak reference acid may be used in the analysis by admixing with a strong unknown acid.

It will be seen that the foregoing invention has been fully described and illustrated by reference to specific examples. It is to be understood that these examples are given by way of illustration only and not by way of limitation.

We claim:

A method for testing the strength of sulfuric acid used as a catalyst in a continuous organic reaction in which a body of sulfuric acid at a concentration within the range of 86 to 99.5% is continuously maintained in a reaction zone as catalyst, in which a stream of fresh acid of a selected uniform concentration within the range of 86 to 99.5% is continuously passed to said reaction zone and introduced into said body of sulfuric acid, which comprises continuously removing a sample stream of catalytic sulfuric acid from said body of sulfuric acid in said reaction zone and passing at least a portion of said sample stream at a selected uniform rate and a selected temperature into admixture with a stream of fresh acid of selected uniform strength within the range of 86 to 99.5% at said selected temperature and at a selected constant rate, contacting the admixture to obtain an equilibrium temperature without substantial transfer of heat thereto or therefrom, and obtaining a signal which is a function of the difference in the value of said equilibrium temperature and said selected temperature of one of said streams used to form said admixture whereby the strength of said sulfuric acid body is determined from said signal and said signal may be employed to vary the volume of said fresh sulfuric acid stream added to said reaction zone.

References Cited in the file of this patent

UNITED STATES PATENTS

| | | |
|---|---|---|
| 1,450,023 | Edelman | Mar. 27, 1923 |
| 1,486,757 | Jensen | Mar. 11, 1924 |
| 2,352,584 | Ziebolz | June 27, 1944 |